(12) United States Patent
Bannon et al.

(10) Patent No.: US 9,390,877 B2
(45) Date of Patent: Jul. 12, 2016

(54) RF MEMS BASED LARGE SCALE CROSS POINT ELECTRICAL SWITCH

(71) Applicant: Google Inc., Mountain View, CA (US)

(72) Inventors: Roy Michael Bannon, Mountain View, CA (US); Leesa Marie Noujeim, Mountain View, CA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 14/134,373

(22) Filed: Dec. 19, 2013

(65) Prior Publication Data

US 2015/0179378 A1 Jun. 25, 2015

(51) Int. Cl.
*H01H 59/00* (2006.01)
*H01R 4/00* (2006.01)
*H04L 12/931* (2013.01)

(52) U.S. Cl.
CPC ............ *H01H 59/0009* (2013.01); *H04L 49/00* (2013.01); *Y10T 307/76* (2015.04)

(58) Field of Classification Search
CPC ........................................................ H01R 4/00
USPC ......................................................... 307/125
See application file for complete search history.

(56) References Cited

U.S. PATENT DOCUMENTS

| 5,578,976 | A | 11/1996 | Yao |
| 6,804,552 | B2 | 10/2004 | Thompson et al. |
| 6,888,420 | B2 | 5/2005 | Schaffner et al. |
| 7,580,354 | B2 | 8/2009 | Dropps et al. |
| 7,778,506 | B2 | 8/2010 | Daneshmand et al. |
| 8,003,906 | B2 | 8/2011 | Ebeling et al. |
| 8,295,299 | B2 | 10/2012 | Dropps et al. |
| 2011/0135312 | A1 | 6/2011 | El-Ahmadi et al. |

FOREIGN PATENT DOCUMENTS

| EP | 0 751 546 | 1/1997 |
| EP | 1 339 452 | 9/2003 |
| EP | 2 506 282 | 10/2012 |

OTHER PUBLICATIONS

Farrington, Nathan, et al. "Helios: A Hybrid Electrical/Optical Switch Architecture for Modular Data Centers" Computer Communication Review, ACM, vol. 41, No. 4, pp. 339-350 (Aug. 30, 2010).
International Search Report and Written Opinion mailed Jul. 29, 2015 in PCT Application No. PCT/US2014/070548.

*Primary Examiner* — Robert Deberadinis
(74) *Attorney, Agent, or Firm* — Edward A. Gordon; John D. Lanza; Foley & Lardner LLP

(57) ABSTRACT

This disclosure provides systems, methods, and apparatus for providing a crosspoint switch used in an optical fiber data network. The crosspoint switch can switch optical signals received from any of a plurality of input optical fibers to any one of a plurality of output optical fibers. The crosspoint switch converts the optical signals received from the input optical fibers into electrical signals, switches the electrical signals, and converts the switched electrical signals back into optical signals before transmitting them over the output optical fibers. A micro-electromechanical systems (MEMS) electrical switch array is utilized to switch the electrical signals. The MEMS electrical switch array includes MEMS switching elements that allow for high frequency and high bandwidth operation of the crosspoint switch. The crosspoint switch can utilize circuit switching methodology for switching decisions.

20 Claims, 6 Drawing Sheets

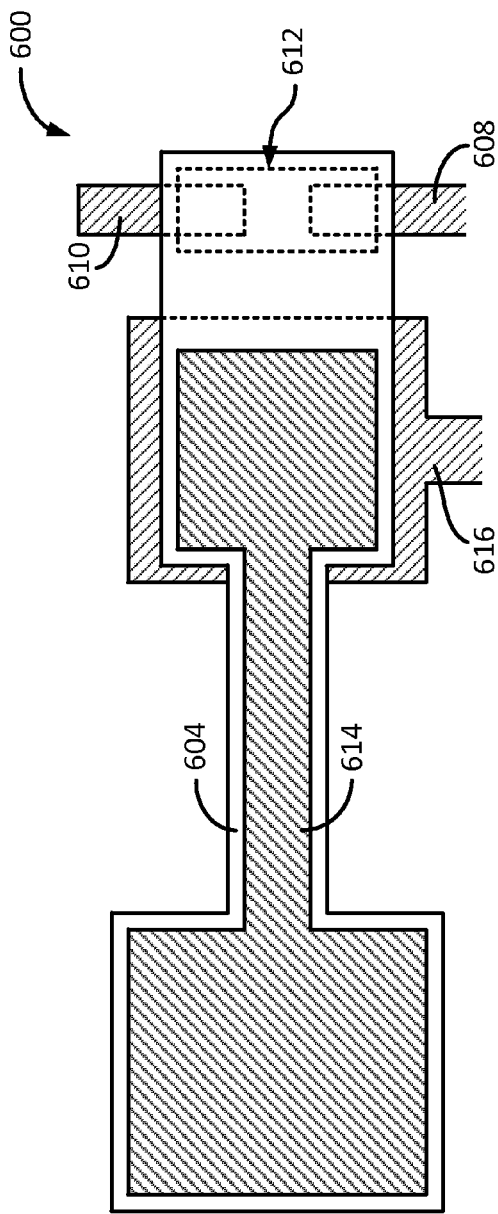
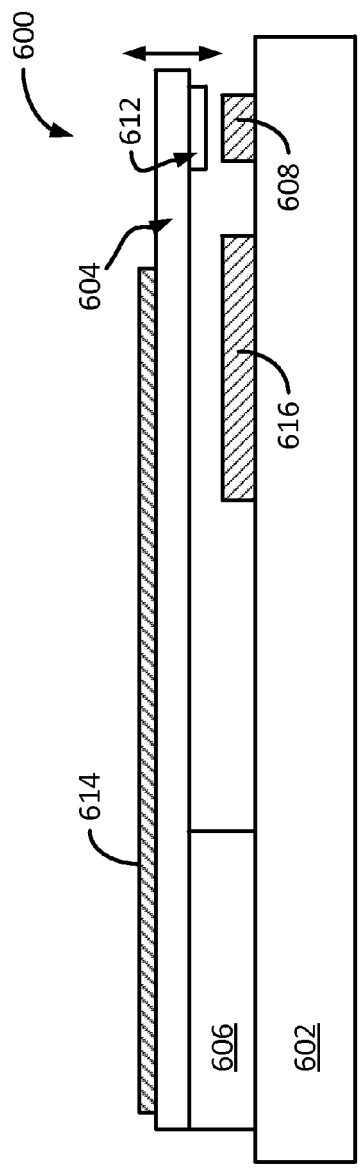
FIGURE 6A
FIGURE 6B

US 9,390,877 B2

RF MEMS BASED LARGE SCALE CROSS POINT ELECTRICAL SWITCH

TECHNICAL FIELD

This disclosure relates to the field of communication networks, and in particular to communication switches.

DESCRIPTION OF THE RELATED TECHNOLOGY

Crossbar or crosspoint switches are commonly used in communication and data networks for routing data from one device in one network to one or more devices in the same and/or a different network. Crosspoint switches typically include a number of input ports, a number of output ports and a switch matrix coupled to the input ports and the output ports. The crosspoint switch, and in particular the switch matrix, can be configured such that data signals provided by any input port can be coupled to any output port.

Crosspoint switch design may be based upon the nature of data signals being transmitted over the network. For example, in some implementations network may transmit data in the form of optical signals over optical fibers. In some such implementations, optical crosspoint switches may be utilized. Optical crosspoint switches may use switchable optical mirrors to direct optical signals, received via optical fibers at optical input ports, to the desired optical output port.

In some implementations, where the networks transmit data signals using electrical signals, the crosspoint switches may include electrical switch matrices to direct electrical data signals received from an input port to the desired output port. The electrical switches can include relays, electronic switches such as transistors, PIN diodes, etc.

In some implementations, the crosspoint switch may include a controller for determining which input ports are connected to which output ports. In some implementations, the crosspoint switch may use packet switching methodology for determining the output port to which a particular data packet is to be routed.

SUMMARY

According to one aspect, the subject matter described in this disclosure relates to a crosspoint switch. The crosspoint switch includes a plurality of input interconnects, each input interconnect coupled to one optical input port, a plurality of output interconnects, each output interconnect coupled to one optical output port, an array of micro-electromechanical-systems (MEMS) electrical switching elements, and a control circuitry configured to provide actuation signals to each of the array of MEMS switching elements. Each MEMS electrical switching element includes a first MEMS switch for electrically connecting a corresponding input interconnect to a corresponding output interconnect, a second MEMS switch for electrically decoupling a portion of the corresponding input interconnect distal to the second MEMS switch relative to a corresponding input port from a portion of the input interconnect proximal to the input port relative to the second MEMS switch, and a third MEMS switch for electrically decoupling a portion of the corresponding output interconnect distal to the third MEMS switch relative to a corresponding output port from a portion of the output interconnect proximal to the output port relative to the third MEMS switch.

According to another aspect, the subject matter described in this disclosure relates to a method for switching input optical signals received at a plurality of input ports to a plurality of output ports. The method includes receiving input optical signals at any one of a plurality of input ports, converting the input optical signals into input electrical signals, controlling a MEMS electrical switch array for selectively directing the input electrical signals to any one of a plurality of output ports, converting the electrical signals at the output port into optical signals, and transmitting the optical signals over optical fibers.

According to another aspect the subject matter described in this disclosure relates to a crosspoint switch. The crosspoint switch includes a plurality of receiving means for receiving optical signals, a plurality of optical-to-electrical converting means for converting the received optical signals into input electrical signals, micro-electromechanical systems (MEMS) switching elements array means for selectively directing the input electrical signals from any one of the plurality of optical-to-electrical converting means to any one of a plurality of electrical-to-optical converting means, a plurality of electrical-to-optical converting means for converting the input electrical signals directed by the switching means into optical signals.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 6A and 6B shows various views of an example MEMS switch.

Like reference numbers and designations in the various drawings indicate like elements.

DETAILED DESCRIPTION

Figure 1:
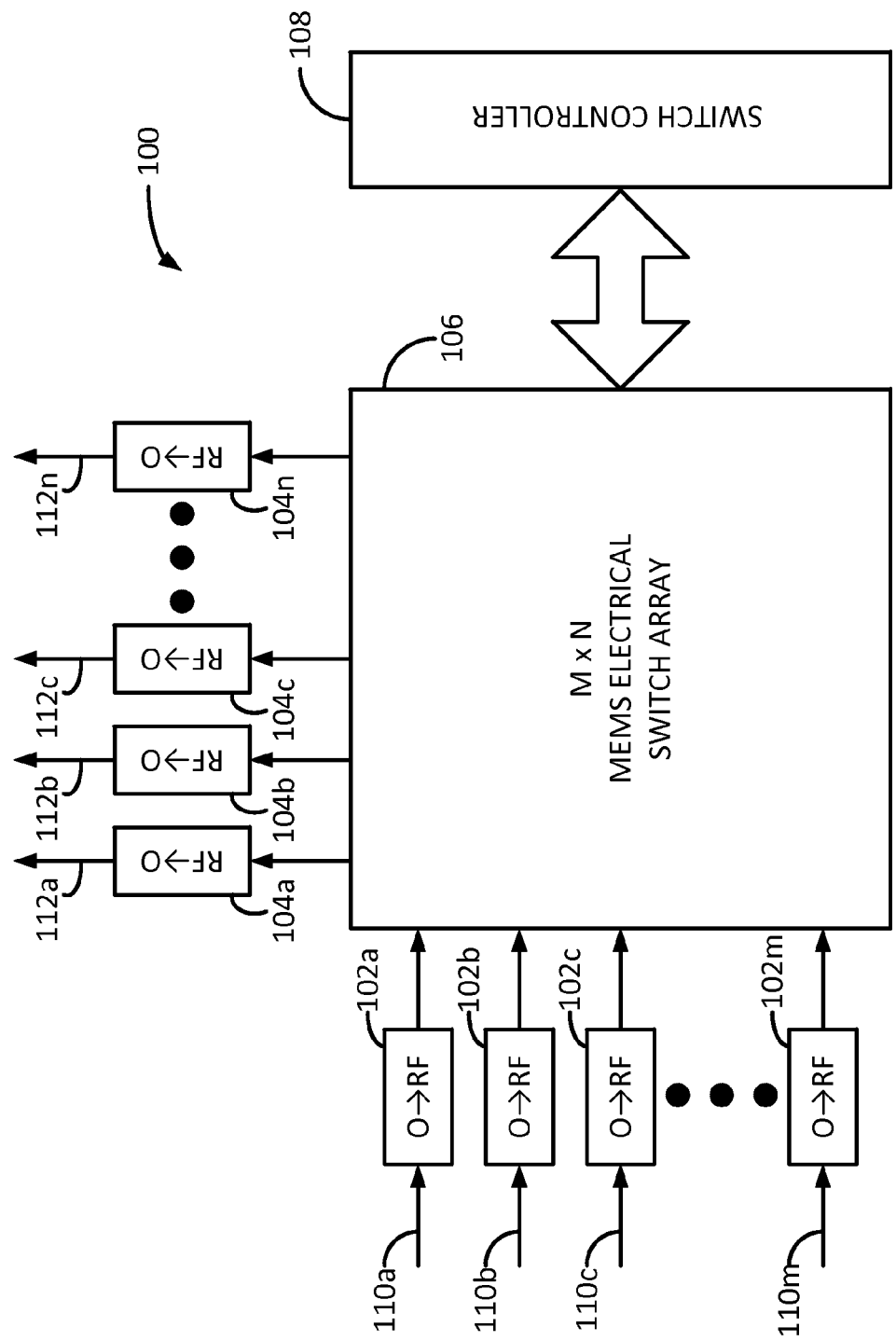
FIG. 1 shows a block diagram of an example micro-electromechanical systems (MEMS) crosspoint switch.

FIG. 1 shows a block diagram of an example micro-electromechanical systems (MEMS) crosspoint switch 100. In some implementations, the MEMS crosspoint switch 100 can be utilized in optical switched networks. The MEMS crosspoint switch 100 includes M optical-to-electrical converters (also referred to as input ports) 102a-102m, N electrical-to-optical converters (also referred to as output ports) 104a-104n, an M×N MEMS electrical switch array 106, and a switch controller 108.

Each of the M optical-to-electrical converters 102a-102m receives optical signals over one of M input optical fibers 110a-110m, and converts the optical signals into respective electrical signals. The electrical signals are fed to the M×N MEMS electrical switch array, which can direct electrical signals received from any one of the M optical-to-electrical converters 102a-102m to any one of N electrical-to-optical converters 104a-104n. Each of the N electrical-to-optical converters 104a-104n, in turn, converts the received electrical signals into optical signals and transmits the optical signals over the respective output optical fiber 112a-112n. In some implementations, the MEMS crosspoint switch 100 may include about 128 to about 256 input ports, or optical-to-electrical converters, and about 128 to about 256 output ports, or electrical-to-optical converters. In some other implementations, the MEMS crosspoint switch 100 may include about 8 to about 256 input and output ports.

In some implementations, the M optical-to-electrical converters 102a-102m can provide a data reception rate of about 10 Gbps to about 25 Gbps. In some implementations, the N electrical-to-optical converters 104a-104n can provide a data transmission rate of about 10 Gbps to about 25 Gbps.

It should be noted that the electrical MEMS crosspoint switch 100 is similar to an optical crossbar switch in that both the MEMS crosspoint switch 100 and the optical crossbar switch receive optical signals and transmit optical signals. However, unlike the optical crossbar switch, which switches the optical signals in the optical domain, the electrical MEMS crossbar switch converts the optical signals in the electrical domain before switching, and thereafter converts the switched electrical signals back into optical signals.

Figure 2:
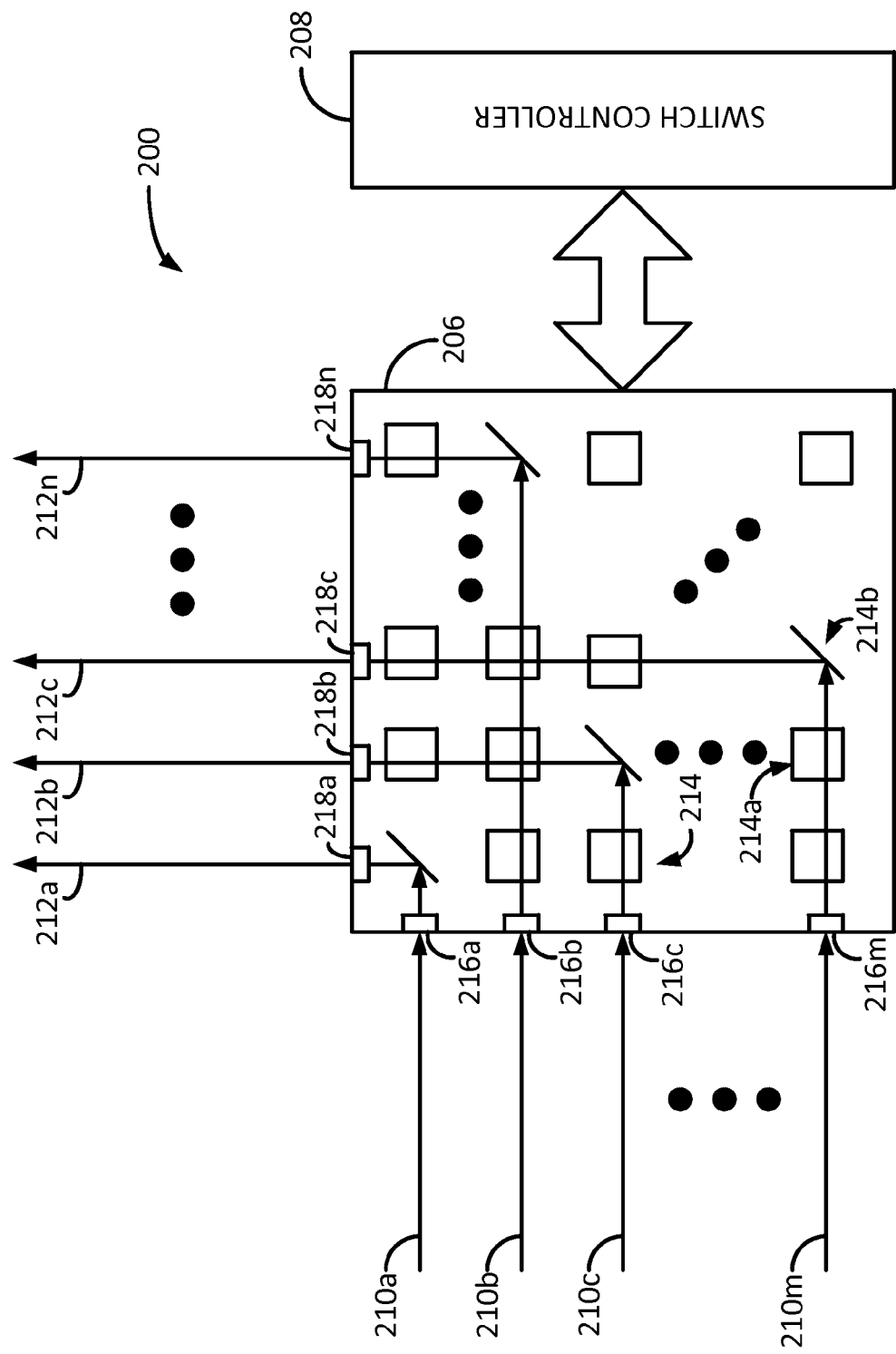
FIG. 2 shows a block diagram of an example fully optical switch.

FIG. 2 shows an example block diagram of a fully optical switch 200. In particular, FIG. 2 shows an M×N optical crossbar switch 200. The optical crossbar switch 200 includes M input ports 216a-216m receiving optical signals from M input optical fibers 210a-210m, respectively. The optical crossbar switch 200 also includes N output ports 218a-218n for transmitting optical signals over N output optical fibers 212a-212n, respectively. The received optical signals from any one of the M input optical fibers 210a-210m can be routed to any one of the N output optical fibers 212a-212n by the optical switch array 206. The optical switch array 206 includes M rows and N columns of mirrors 214. The mirrors 214 are configured such that in a first position (e.g., a horizontal position 214a), the mirrors do not interfere the light received from the input optical fiber in their respective row (e.g., optical signal received from the input optical fiber 210m). In the second position (e.g., a vertical position 214b with a 45 degree sideways tilt), the mirrors 214 reflect the optical signal received from the input optical fiber in their respective row (e.g., optical signal received from the input optical fiber 210m) to the output optical fiber in their respective column (e.g., output optical fiber 212c). The mirrors 214 are switched into the first position or the second position using a positioning mechanism (not shown), which can be controlled by the switch controller 208.

However, the switching mechanism utilized for positioning the mirrors 214 in the first position 214a or in the second position 214b can be costly and difficult to control. The high cost and difficulty arise from the fact that the optical signals received from each input optical fiber is in the form of a narrow laser beam, and reflecting the narrow laser beam accurately at the desired output optical fiber is not trivial. This cost and difficulty is exacerbated with an increase in the number of inputs and outputs or with the increase in the size of the optical switch array 206. The difficulty in accurately positioning the mirrors 214 may also contribute to the time needed to establish an optical path between an input optical fiber and an output optical fiber.

The MEMS crosspoint switch 100 shown in FIG. 1A, on the other hand, alleviates the costs and difficulties associated with the optical crosspoint switch 200 by utilizing an electrical switch array instead of an optical switch array 206. In particular, as mentioned above, the MEMS crosspoint switch 100 uses an electrical MEMS switching array 106. The optical signals received from the input optical fibers are not switched in the optical domain, but instead, are first converted into an electrical signal and routed electrically. At the output, the electrical signals are converted back into optical signals and transmitted over the output optical fibers.

Referring again to FIG. 1, the switch controller 108 controls the M×N MEMS electrical switches in the MEMS electrical switch array 106 to route electrical signals received from each of the M optical-to-electrical converters 102a-102m to the appropriate one of N electrical-to-optical converters 104a-104n. In some implementations, the switch controller 108 controls the MEMS electrical switch array 106 without examining the contents of each optical signal received on the M input optical fibers 110a-110m. For example, in some implementations, the switch controller 108 may employ circuit switching techniques to control the MEMS electrical switch array. In circuit switching techniques, the switch controller 108 is data and format agnostic, i.e., the switch controller 108 does not examine the optical signals for data at the physical layer, or for the format of the data at the data or upper network layers and can operate on signals of a wide range of frequencies without any regard to the data format. This is in contrast with packet switching technique typically utilized in datagram routers in which incoming optical signals are examined at both the physical layer and the upper network layers. As such, switches that implement circuit switching techniques are generally forward and backward compatible with changes to connected network infrastructure, whereas packet switches are less likely to be. Both circuit switching and packet switching techniques are discussed below.

Figure 3:
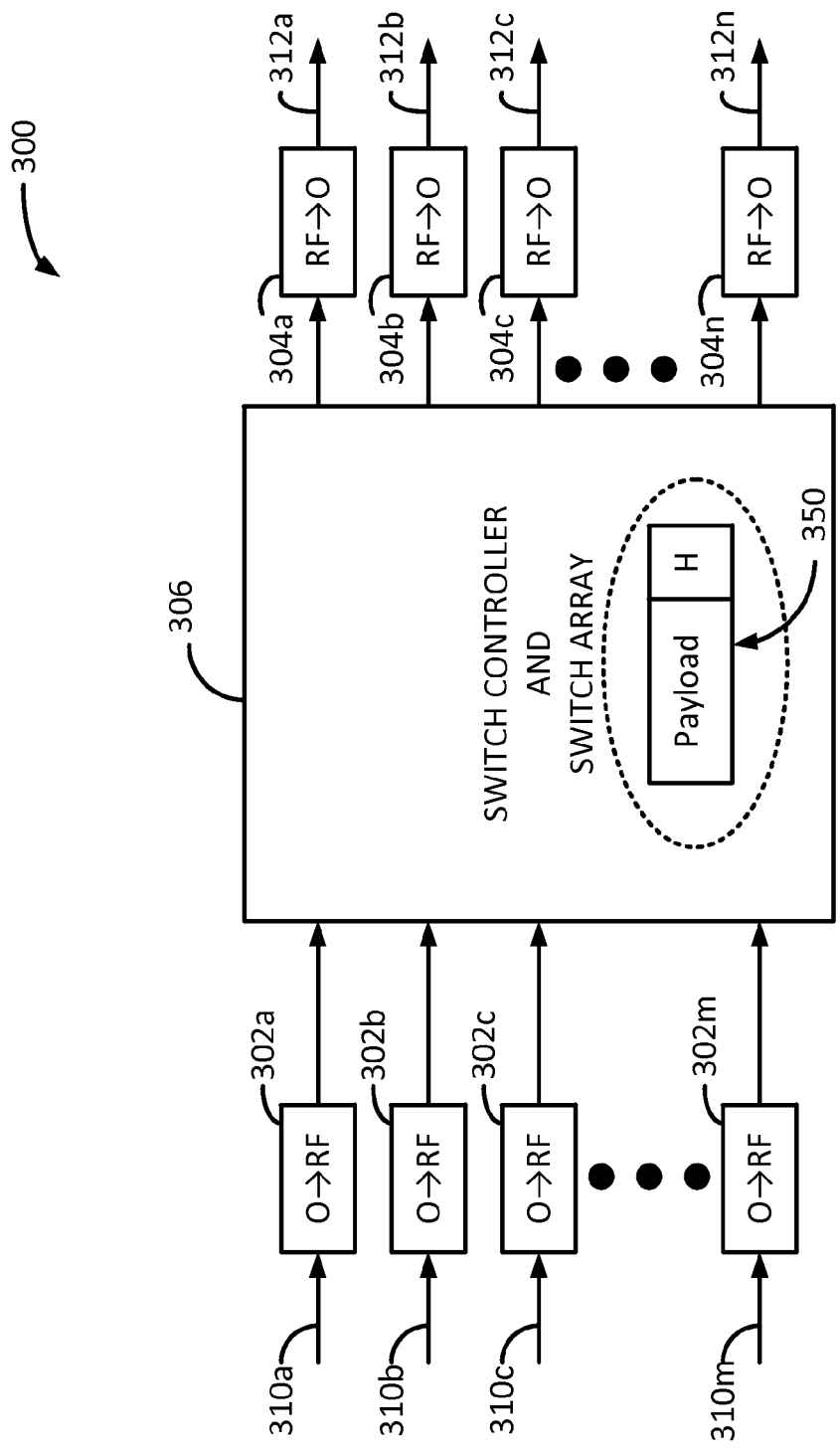
FIG. 3 shows an example packet switching router.

FIG. 3 shows an example packet switching router 300. The packet switching router 300 includes M optical-to-electrical converters 302a-302m receiving optical signals from M input optical fibers 310a-310m respectively. The M optical-to-electrical converters 302a-302m convert the received optical signals into electrical signals (typically RF) and provide the converted electrical signals to a controller and switch array 306. The controller and switch array 306 can examine the converted electrical signals to determine baud rate, the encoding (e.g., NRZ data, 64/66 bit encoding, etc.) and other physical layer parameters to obtain the data represented by the converted electrical signals. Thereafter, the controller and switch array 306 can store the data in a data buffer. The controller and switch array 206 can examine the data stored in the data buffer to identify the format of the data packets or data frames. For example, the controller and switch array 306 can identify several packets, such as a packet 350, which can include a header H and Payload data. The header H includes the destination address of the packet 350. The packet 350 can include, for example, an Internet Protocol packet, an Ethernet packet, a Fibre Channel frame, etc. The controller and switch array 306 can parse through the header H to identify the destination address of the packet 350.

The controller and switch array 306 can also store, in memory, a routing table that maps destination addresses to output ports of the switching router 300.

Specifically, the routing table maps destination addresses to one of N electrical-to-optical converters 304a-304n. Each of the N electrical-to-optical converters 304a-304n is coupled to one of N output optical fibers 312a-312n. Based on the routing table, the controller and switch array 306 may route the packet 350 to, for example, the optical-to-electrical converter 304b. This means that the stream of 0s and 1s that form the data packet 350 are sent to the electrical-to-optical converter 304b as electrical signals. The electrical-to-optical converter 304b converts these electrical signals into optical signals and transmits the optical signals over the output optical fiber 312b.

Basing routing decisions on the data received by the packet switching router 300 increases routing latency. This latency is a result of the time required by the controller and switch array 306 to examine each packet for its format and contents, such as a destination address, and to route the packet to the appropriate output port based on the destination address and the routing table. In some instances, the routing latency may be negatively impacted by increased network congestion, large packet size, etc. Furthermore, time spent in decoding the data at the physical layer also adds to the overall latency of the packet switching router 300.

The MEMS crosspoint switch 100 shown in FIG. 1A, on the other hand, alleviates the routing latency associated with the packet switching router 300 by routing incoming signals without examining the data or the format of the data carried by those incoming signals and with little to no regard to the data rate or the encoding of the signal. Instead, in some implementations, the controller 108 can receive out-of-band control signals, which include the desired output ports to which at least one of the incoming optical signals are to be routed. The routing paths indicated by the control signals typically form a portion of a virtual-circuit formed between two devices within the network. In some implementations, the out-of-band control signals (either optical or electrical) may be received by the controller 108 via an administration port (not shown), which can also be used to receive commands associated with maintenance of the MEMS crosspoint switch. In some implementations, the out-of-band control signals may be received by the controller 108 at a dedicated input port that is not switched by or coupled to the MEMS electrical switch array 106.

In some other implementations, the out-of-band control signals may be received on the same fiber optic cables over which optical signals associated with data are received. For example, out-of-band control signals can be received on the input optical fiber 110*m*, where the control signals can indicate the output port to which the data received on the input optical fiber 110*m* is to be routed. The controller 108 receives the control signals and configures the M×N MEMS electrical switch array 106 so that the optical signals associated with data received via the input optical fiber 110*m* is routed to the requested output port, if available.

In some implementations, the MEMS crosspoint switch may form a part of a circuit-switched virtual network path. In circuit-switched virtual networks, a data path from one device within a network to another device within the same or different network is established prior to transmission of data. In such implementations, the switch controller 108 can receive out-of-band control signals, in a manner discussed above, for establishing a transmission path between optical signals received on one optical fiber to another optical fiber.

As discussed above, the MEMS crosspoint switch 100 utilizes MEMS electrical switches, instead of MEMS mirrors, for routing input signals to output ports. By utilizing MEMS electrical switches, the MEMS crosspoint switch 100 provides a switch with similar bandwidth as a fully optical crosspoint switch, but without the costs, switching delays, and complexity associated with a fully optical switch, while providing significantly improved performance over packet switched opto-electrical switches by utilizing circuit switching instead of packet switching. In addition, because the MEMS crosspoint switch 100 can be generally data rate and data format agnostic, it can be used with a wide range of network infrastructure components. The following discussion provides examples of the MEMS electrical switch array 106.

Figure 4:
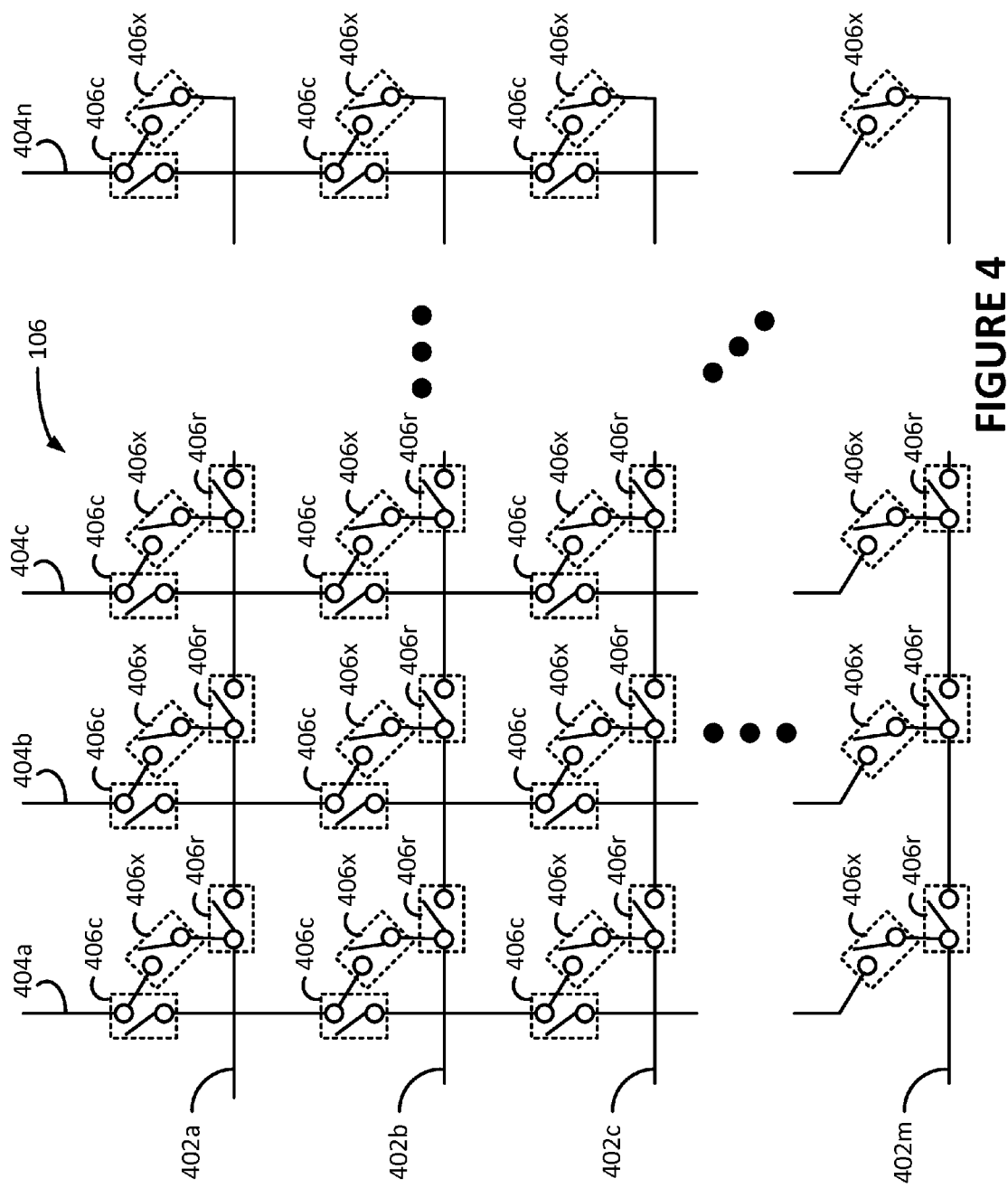
FIG. 4 shows a schematic of an example M×N MEMS electrical switch array.

FIG. 4 shows a schematic of an example M×N MEMS electrical switch array 106. As mentioned above, the M×N MEMS electrical switch array 106 includes MEMS electrical switches for routing electrical signals. The MEMS electrical switch array 106 includes M row interconnects 402*a*-402*m* and N column interconnects 404*a*-404*n*. Each of the M row interconnects 402*a*-402*m* can be coupled to one of M optical-to-electrical converters 102*a*-102*m* (shown in FIG. 1), while each of the N column interconnects 404*a*-404*n* can be coupled to one of N electrical-to-optical converters 104*a*-104*n* (shown in FIG. 1). Each of the M row interconnects 402*a*-402*m* and N column interconnects 404*a*-404*n* can be electrical conductors that are capable of carrying high frequency electrical signals (e.g., over 10 GHz). In some implementations, the high frequency electrical signals can include RF electrical signals. In some other implementations, the high frequency electrical signals can include microwave signals.

MEMS switches are included at the intersection of each row and column interconnects. For example, three MEMS switches: column switch 406*c*, cross switch 406*x*, and row switch 406*r* are included at the intersection of the row interconnect 402*a* and the column interconnect 404*a*. Furthermore, two switches are included at the intersections of a last row interconnect and all but the last column interconnect, and at the intersections of a last column interconnect and all but the last row interconnect. For example, two switches: cross switch 406*x* and row switch 406*r* are included at the intersections of the last row interconnect 402*m* and all column interconnects except for the last column interconnect 404*n*. Similarly, two switches: cross switch 406*x* and column switch 406*c* are included at the intersections of the last column interconnect 404*n* and all row interconnects except the last row interconnect 402*m*. Only one switch: the cross switch 406*x*, is included at the intersection of the last row interconnect 402*m* and the last column interconnect 404*n*.

Each switch can operate between two states: OPEN and CLOSED. The states of each switch can be controlled by the switch controller 108 (shown in FIG. 1). Generally, the switch controller 108 can configure each switch independently based on desired routing methodology.

The row switch 406*r* in the OPEN state can decouple portions of the corresponding row interconnect. For example, at the intersection of the row interconnect 402*a* and the column interconnect 404*a*, the row switch 406*r* in the OPEN state can decouple the portions of the row interconnect 402*a* on either side of the row switch 406*r*. Stated in a different way, in the OPEN state, the row switch 406*r* decouples the portion of the row interconnect distal to the row switch 406*r* relative to the input port corresponding to the row interconnect 402*a* from the portion of the row interconnect proximal to the input port relative to the row switch 406*r*.

Similarly, the column switch 406*c*, in the OPEN state can decouple portions of the column interconnect 404*a* on either side of the column switch 406*c*. Stated in a different way, in the OPEN state, the column switch 406*c* decouples the portion of the column interconnect 404*a* distal to the column switch 406*c* relative to the output port corresponding to the column interconnect 404*a* from the portion of the column interconnect 404*a* that is proximal to the output port relative to the column switch 406*c*. The cross switch 406*x* connects or disconnects portions of the row interconnect 402*a* proximal to the input port to the portions the column interconnect 404*a* proximal to the output port.

The switch controller 108 selectively places the row and column switches in OPEN or CLOSED states such that portions of the row and column interconnects that do not lie in the shortest electrical path between the input port and the output port are decoupled. Decoupling these nonessential portions of the row and column interconnects from the electrical shortest path between the input and the output port can reduce RF reflections. Reducing RF reflections can increase the frequency of the electrical signal that can be communicated between the input and the output port. This increase in frequency, in turn, increases the bandwidth of the MEMS crosspoint switch 100.

Figure 5:
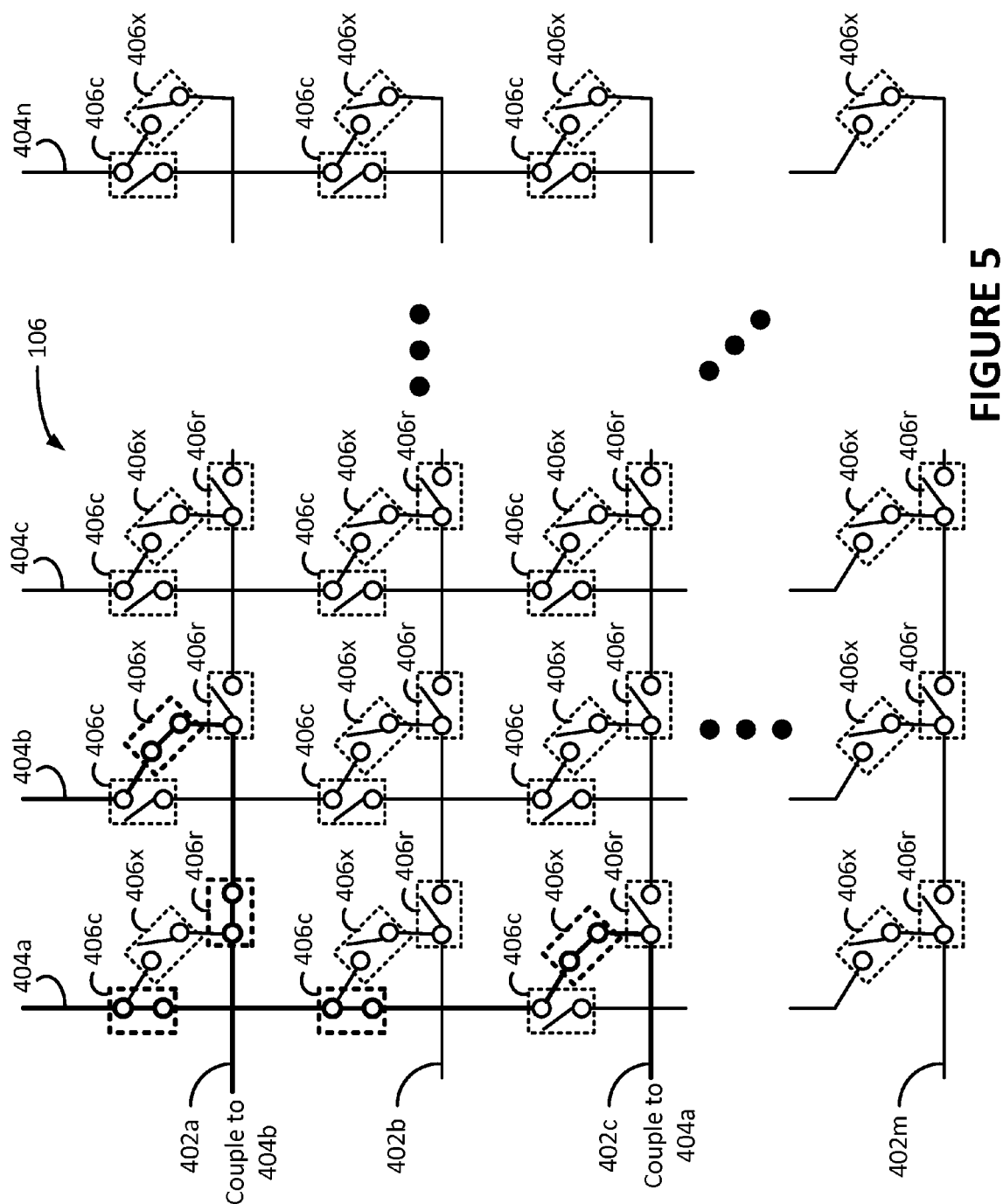
FIG. 5 shows an example configuration of the MEMS crossbar matrix shown in FIG. 4.

FIG. 5 shows an example configuration of the MEMS electrical switch array 106 shown in FIG. 4. In particular, the MEMS electrical switch array 106 shown in FIG. 5 is configured such that electrical signals received at input ports associated with the row interconnects 402a and 402c are coupled to output ports associated with column interconnects 404b and 404a, respectively. This means that the MEMS electrical switch array 106 is configured such that the row interconnect 402a is electrically coupled to the column interconnect 404b and that the row interconnect 402c is electrically coupled to the column interconnect 404a.

As shown in FIG. 5, the cross switch 406x at the intersection of the row interconnect 402a and the column interconnect 404b can be switched to the CLOSED state. Furthermore, any row switch 406r in the electrical path from the input port associated with the row interconnect 402a to the CLOSED cross switch 406x can be switched to the CLOSED state. This allows electrical signals from the input port associated with the row interconnect 402a to be provided to the output port associated with the column interconnect 404b.

However, both the row switch 406r and the column switch 406c at the intersection of the row interconnect 402a and the column interconnect 404b are switched to an OPEN state. This decouples the portion of the row interconnect 402a and the portion of the column interconnect 404b that is not in the shortest electrical path (indicated by bold lines). By decoupling these portions of the row interconnect 402a and the column interconnect 404b, RF reflections can be reduced.

Similarly, the cross switch 406x at the intersection of the row interconnect 402b and the column interconnect 404a can be switched to the CLOSED state. Furthermore, any column switch 406c in the electrical path from the CLOSED cross switch 406x to the output port associated with the column interconnect 404a can be switched to the CLOSED state. This provides an electrical path between the input port associated with the row interconnect 402c and the output port associated with the column interconnect 404a.

In addition, both the row switch 406r and the column switch 406c at the intersection of the row interconnect 402c and the column interconnect 404a are switched to the OPEN state. This decouples the portion of the row interconnect 402c and the portion of the column interconnect 404a that are not in the shortest electrical path (indicated by bold lines). By decoupling these portions of the row interconnect 402c and the column interconnect 404a, RF reflections can be reduced.

Some conventional crosspoint switches utilize transistors switches for switching elements that form an electrical switch array. For example, such crosspoint switches may utilize transistors switches for the row switch 406r, the cross switch 406x, and the column switch 406c shown in FIG. 4. However, transistor switches are limited in their ability to switch high frequency signals. For example, for RF electrical signals, transistor switches suffer from poor electrical isolation between switch terminals and high insertion losses. Thus, crosspoint switches utilizing transistor switches are limited to low frequency operations.

MEMS switches, on the other hand, are capable of handling GHz signal frequencies while maintaining high electrical isolation between switch terminals and minimal insertion losses. Therefore, crosspoint switches, such as the MEMS crosspoint switch 100 shown in FIG. 1, which utilize MEMS switches, can provide excellent high frequency operation.

FIGS. 6A and 6B show various views of an example MEMS switch 600. In particular, FIG. 6A shows a top view while FIG. 6B shows a side cross-sectional view of the example MEMS switch 600. MEMS switch 600 can be utilized as a MEMS switch in the MEMS electrical switch array 106 discussed above in FIGS. 1, 4 and 5. For example, the MEMS switch 600 can be utilized as the row switch 406r, the cross switch 406x, and the column switch 406c.

Referring to FIGS. 6A and 6B, MEMS switch 600 can be fabricated on a substrate 602, such as silicon, gallium-arsenide (GaAs), etc., for example, using generally known micro-fabrication techniques such as masking, etching, deposition, and lift-off. The MEMS switch 600 includes a cantilever arm 604, which is supported on one end by an anchor 606, while the other end is suspended over closely placed switch terminals 608 and 610. In some implementations, the cantilever arm 604 can be formed of semiconducting, semi-insulating, or insulating material, such as silicon dioxide or silicon nitride. A portion of the cantilever arm 604 that is suspended directly over the switch terminals 608 and 610 includes a contact 612. The switch terminals 608 and 610 and the contact 612 can be formed of any electrically conducting material, for example, metals such as aluminum, copper, gold, etc.

An actuation portion of the MEMS switch includes a top electrode 614 formed over the surface of the cantilever arm 604 that is facing away from the substrate. The actuation portion also includes a bottom electrode 616. The top electrode 614 and the bottom electrode can be formed of metals such as aluminum, gold, etc. The cantilever arm 604 and the top electrode 614 are broadened in a region that lies directly over the bottom electrode. The metal top electrode 614, the insulating cantilever arm 604 and the metal bottom electrode form a capacitor structure.

During operation, the MEMS switch is normally in an OPEN state, as shown in FIG. 6B. In the OPEN state, the cantilever arm 604 is in a position such that the contact 612 does not make contact with the switch terminals 608 and 610. To switch the MEMS switch into a CLOSED state, a voltage difference can applied between the top electrode 614 and the bottom electrode 616. This results in the generation of electrostatic forces between the top electrode 614 and the bottom electrode 616. The electrostatic forces pull the cantilever arm 604 towards the bottom electrode 616, causing the contact 612 to touch both switch terminals 608 and 610. Thus, an electrical path is formed between the two switch terminals 608 and 610.

To switch the MEMS switch 600 back to the OPEN state, the voltage difference between the top electrode 614 and the bottom electrode 616 is removed. This causes the cantilever arm to move back into a position shown in FIG. 6B. In this position, the contact 612 no longer makes contact with the terminals 608 and 610 of the MEMS switch 600. As a result, the electrical path between the switch terminals 608 and 610 ceases to exist.

In some implementations, in the CLOSED state, the MEMS switch 600 can be capable of allowing without appreciable attenuation electrical signals with frequencies between about 10 GHz and about 25 GHz between the switch terminals 608 and 610. In some implementations, in the CLOSED state, the MEMS switch 600 can be capable of passing data at a rate of about 10 Gbps to about 25 Gbps. In some other implementations, the data rate can be above 25 Gbps.

Employing MEMS switches, such as the one shown in FIGS. 6A and 6B, can allow building the MEMS electrical switch array 106 (shown in FIGS. 4 and 5) onto integrated circuits. In some implementations, the entire MEMS electrical switch array 106 may be fabricated on a single substrate. In some such implementations, the M×N MEMS electrical switch array 106 can be configured such that the number of input ports M can be equal to a number between about 128 and about 256 and can be configured such that the number of output ports N can be equal to a number between about 128 and about 256.

Further, as mentioned above, using electrical MEMS switches for the switch matrix alleviates the cost, difficulty of operation, and delays associated with using MEMS mirrors for the switch matrix.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A crosspoint switch comprising:
   a plurality of input interconnects, each input interconnect coupled to one optical input port;
   a plurality of output interconnects, each output interconnect coupled to one optical output port;
   an array of micro-electromechanical-systems (MEMS) electrical switching elements, each MEMS electrical switching element including:
      a first MEMS switch for electrically connecting a corresponding input interconnect to a corresponding output interconnect,
      a second MEMS switch for electrically decoupling a portion of the corresponding input interconnect distal to the second MEMS switch relative to a corresponding input port from a portion of the input interconnect proximal to the input port relative to the second MEMS switch, and
      a third MEMS switch for electrically decoupling a portion of the corresponding output interconnect distal to the third MEMS switch relative to a corresponding output port from a portion of the output interconnect proximal to the output port relative to the third MEMS switch; and
   control circuitry configured to provide actuation signals to each of the array of MEMS switching elements.

2. The crosspoint switch of claim 1, wherein each input port includes an input port converter configured to convert optical signals received at the crosspoint switch to electrical signals, and wherein each output port includes an output port converter configured to convert electrical signals received from a corresponding output interconnect to optical signals for output from the crosspoint switch.

3. The crosspoint switch of claim 1, wherein each switching element is configured to operate at a signal bandwidth of at least 10 Gbps.

4. The crosspoint switch of claim 1, wherein the control circuitry is configured to receive control signals out-of-band from the input signals received on the input port and to provide the actuation signals based on the out-of-band control signals.

5. The crosspoint switch of claim 4, wherein the control circuitry includes a dedicated input port for receiving the out-of-band control signals independent of the array of MEMS electrical switching elements.

6. The crosspoint switch of claim 4, wherein the out-of-band control signals are received at an input port prior to the reception of the input signals.

7. The crosspoint switch of claim 1, wherein the control circuitry is further configured to provide actuation signals based on circuit-switching methodology.

8. The crosspoint switch of claim 1, wherein a number of input ports is greater than 128 and a number of output ports is greater than 128.

9. The crosspoint switch of claim 1, wherein the control circuitry is further configured to provide actuation signals independent of a content of the input signals.

10. The crosspoint switch of claim 1, wherein the at least one of the array of MEMS switching elements includes a cantilever MEMS switch.

11. A method for switching input optical signals received at a plurality of input ports to a plurality of output ports comprising:
   receiving input optical signals at any one of a plurality of input ports;
   converting the input optical signals into input electrical signals;
   controlling a MEMS electrical switch array for selectively directing the input electrical signals to any one of a plurality of output ports;
   converting the electrical signals at the output port into optical signals, and
   transmitting the optical signals over optical fibers.

12. The method of claim 11, wherein controlling a MEMS electrical switch array for selectively directing the input electrical signals to any one of the plurality of output ports includes:
   closing a first MEMS electrical switch to electrically connect an input interconnect coupled to the any one of the plurality of input ports to an output interconnect coupled to the any one or the plurality of output ports,
   opening a second MEMS electrical switch to electrically disconnect a portion of the input interconnect distal to the second MEMS electrical switch relative to the any one of the plurality of input ports from a portion of the input interconnect proximal to the any one of the plurality of input ports relative to the second MEMS electrical switch, and
   opening a third MEMS electrical switch to electrically disconnect a portion of the output interconnect distal to the third MEMS electrical switch relative to the any one of the plurality of output ports from a portion of the output interconnect proximal to the any one of the plurality of output ports relative to the third MEMS electrical switch.

13. The method of claim 11, wherein controlling a MEMS electrical switch array for selectively directing the input electrical signals to any one of the plurality of output ports includes receiving control signals out-of-band from the input optical signals and basing the controlling of the MEMS electrical switch array at least one the received control signals.

14. The method of claim 13, wherein receiving the control signals out-of-band from the input optical signals includes receiving the control signals prior to the input optical signals.

15. The method of claim 11, wherein controlling a MEMS electrical switch array for selectively directing the input electrical signals to any one of the plurality of output ports includes controlling the MEMS electrical switch array based on circuit switched methodology.

16. The method of claim 11, wherein controlling a MEMS electrical switch array for selectively directing the input electrical signals to any one of the plurality of output ports includes controlling the MEMS electrical switch array independent of a content of the input optical signals.

17. The method of claim 11, wherein receiving input optical signals at any one of a plurality of input ports includes receiving input optical signals at any one of at least 128 input ports, and wherein controlling a MEMS electrical switch array for selectively directing the input electrical signals to any one of a plurality of output ports includes controlling the MEMS electrical switch array for selectively directing the input electrical signals to any one of at least 128 output ports.

18. A crosspoint switch comprising:

a plurality of receiving means for receiving optical signals;

a plurality of optical-to-electrical converting means for converting the received optical signals into input electrical signals;

micro-electromechanical systems (MEMS) switching elements array means for selectively directing the input electrical signals from any one of the plurality of optical-to-electrical converting means to any one of a plurality of electrical-to-optical converting means;

a plurality of electrical-to-optical converting means for converting the input electrical signals directed by the switching means into optical signals.

19. The crosspoint switch of claim 18, wherein at least one MEMS switching element in the MEMS switching array means includes:

a first MEMS switching means for electrically connecting an input interconnect, coupled to one of the plurality of optical-to-electrical converting means, to an output interconnect coupled to one of the plurality of electrical-to-optical converting means;

a second MEMS switching means for electrically decoupling a portion of the input interconnect distal to the second MEMS switching means relative to the corresponding optical-to-electrical converting means from a portion of the input interconnect proximal to the corresponding optical-to-electrical converting means relative to the second MEMS switching means; and a third MEMS switching means for electrically decoupling a portion of the output interconnect distal to the third MEMS switching means relative to the corresponding electrical-to-optical converting means from a portion of the output interconnect proximal to the corresponding electrical-to-optical converting means relative to the third MEMS switching means.

20. The crosspoint switch of claim 18, further comprising control means for controlling the configuration of MEMS switching elements array means based in part on control signals received out-of-band from the received optical signals.

* * * * *